United States Patent [19]

Brock

[11] 4,068,978

[45] Jan. 17, 1978

[54] ASSOCIATING DRILL CHUCK KEYS WITH DRILL

[76] Inventor: J. Farny Brock, 11531 Samoline Ave., Downey, Calif. 90241

[21] Appl. No.: 716,116

[22] Filed: Aug. 20, 1976

[51] Int. Cl.² .................... B23B 39/00; B25B 13/44; B23Q 11/00
[52] U.S. Cl. .................. 408/241 R; 81/90 A; 279/1 K
[58] Field of Search ............... 279/1 K; 408/241 R; 81/90 A, 125, 180 R

[56] References Cited

U.S. PATENT DOCUMENTS

| | | | |
|---|---|---|---|
| 2,467,827 | 4/1949 | Hinton | 81/90 A |
| 2,807,732 | 9/1957 | Kurtovich | 279/1 K |
| 3,049,946 | 8/1962 | Schelke | 408/241 |
| 3,190,665 | 6/1965 | Sztricsko | 279/1 K |
| 3,728,038 | 4/1973 | Gage | 408/241 |
| 3,947,924 | 4/1976 | Fox et al. | 279/1 K X |

Primary Examiner—Z. R. Bilinksy
Attorney, Agent, or Firm—Grover A. Frater

[57] ABSTRACT

A means for holding a drill chuck key in operative position on a drill chuck is provided by a pair of arms that straddle the chuck and include a shape and resilience to ensure that the chuck will be brought into operative position by cam action, and thereafter, held in proper position. That is augmented by a means for detachably securing the chuck key to another part of the drill when it is not in use to adjust the chuck. That function is accomplished with a retaining element associated with the key or with the drill, and which, when associated with the drill, has a shape so that the arms by which the key is fastened to the chuck co-act in the same way with the retaining element as with the chuck.

10 Claims, 8 Drawing Figures

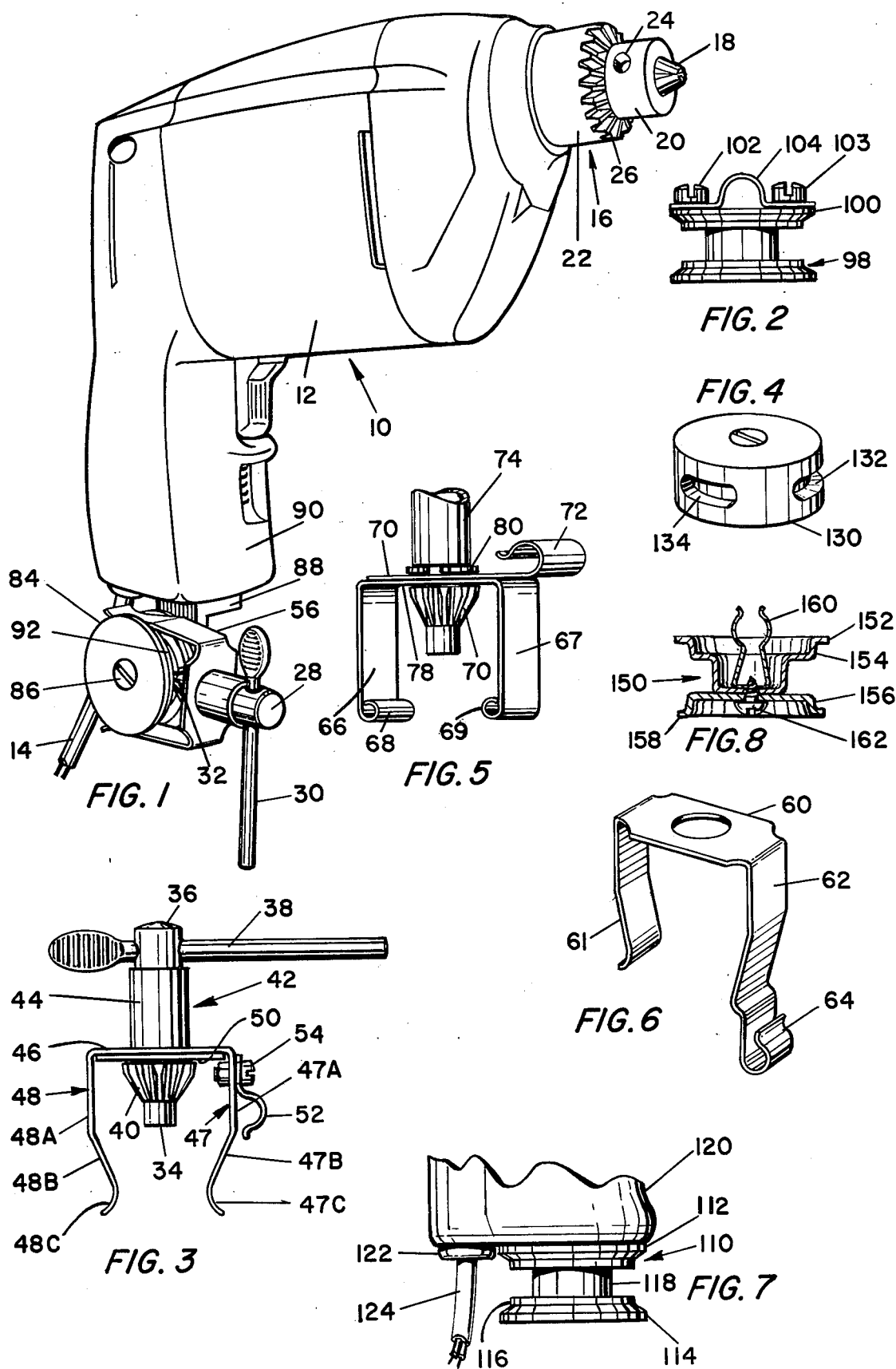

ASSOCIATING DRILL CHUCK KEYS WITH DRILL

This invention relates to improvements in means for associating drill chuck keys with drills of the kind that employ a chuck which is operated by a chuck key.

The drill chuck that is commonly employed with power drills, including hand-held, portable, electric drills, employs a set of jaws that are contained in a two-part housing. Relative movement of those parts of the housing is effective to open and close the jaws. One of those parts of the housing is provided with a cylindrical recess, or keyhole, and the other part is formed with bevelled gear that encompasses the chuck. Relative movement of those two parts is accomplished with a key comprising, is most instances, a cylindrical shank having a turning handle at one end and a pin to fit into the key hole of the chuck at its other end. A bevelled gear is formed on the shank adjacent to the pin. The shank, bevel gear, and pin are formed on a common axis. When the pin is inserted into the keyhole of the chuck, the bevelled gear of the key meshes with the bevelled gear on the chuck.

That combination of chuck and key presents two problems. First, the key must be removed from the chuck before the drill can be operated safely and, thus, it is easily misplaced. Second, considerable mechanical advantage is required to tighten the jaws of the chuck adequately. As a consequence, it is often necessary to turn the key through many revolutions when adjusting the jaws to accommodate drills of different sizes. With respect to the first of those problems, a variety of arrangements have been devised and created for attaching the key to the drill so that it is less likely to be lost. One of the simplest of those arrangements has been to tie the key to one end of a string whose other end is tied to the drill or its electric power cord, but that solution is not always satisfactory.

A number of arrangements have been devised for solving the other problem. Keys and chucks have been arranged so that the key can be attached to the chuck so that it need not be held with one hand while the other hand is used on the handle, but prior structures have been complex and none of the prior art structures solve both problems.

SUMMARY OF THE INVENTION

It is an object of this invention to provide a means for providing a better solution for those two problems. Thus, it is an object of the invention to provide an improved means by which a chuck key can be clamped onto a chuck such that only one hand is needed to operate the key, notwithstanding that the handle must be turned through a number of revolutions in adjusting the chuck.

It is an object to provide improved means by which the chuck key may be retained with a drill. In a preferred form of the invention, the same structure is employed to perform both functions.

In the invention, an improved fastening means is employed to clamp the key on the chuck with its pin in the keyhole of the chuck and its bevelled gear in engagement with the gear of the chuck. In the preferred embodiment, that same fastening means is employed to clamp the key to the drill. A preferred fastening means employs spaced arms formed of resilient material, or is otherwise biased, so that those arms will embrace the chuck forcing the pin and bevel gear into proper operating position by cam action.

The fastening means is coupled with a retainer by which the key may be retained with the drill when not in use with the chuck. The retainer may comprise an element on the fastening means that can be clipped to the drill housing or power cable. However, in the preferred form, the retainer has the form of a keeper which is fixed to the drill, either to the body of the drill or to its power cable, and which cooperates with the fastening means such that the key can be clamped to the retainer or keeper in substantially the same fashion in which it is fastened to the chuck.

Other objects and advantages of the invention will hereinafter appear upon the reading of the specification that follows, and upon an examination of the accompanying drawings.

IN THE DRAWINGS

FIG. 1 is an isometric view of an electrically powered, portable drill, together with a key, key fastening means, and key retainer, according to the invention;

FIG. 2 is an elevational view of a retainer of the kind shown in FIG. 1, modified to include a structure by which the retainer can be fixed to the powr cord of the drill;

FIG. 3 is a view in elevation of a key and key fastening means like that shown in FIG. 1 except for the addition of a retainer member;

FIG. 4 is an isometric view of an alternative form of key retainer member;

FIG. 5 is an isometric view of an alternative form of fastening means and retainer fixed to a fragment of a key;

FIG. 6 is an isometric view of another form of fastening means;

FIG. 7 is a view in side elevation of a retainer of the kind shown in FIGS. 1 and 2, together with a fragment of the drill of FIG. 1 showing an alternative arrangement for fastening the retainer to the drill housing; and FIG. 8 is a cross-sectional central view of a modified form of spool retainer.

DESCRIPTION OF THE PREFERRED EMBODIMENT

The drill 10 shown in FIG. 1 is an electrically powdered portable unit which includes a housing 12, an electrical power cord 14, and a chuck, generally designated 16. The chuck includes clamping members 18 which open and close and response to relative movement between the first part 20 of the chuck 16, and a second part 22. Both of those parts are generally cylindrical, the second having larger diameter than the first. Several radial, cylindrical recesses are formed in the first part at spaced points around its periphery. Those recesses serve as keyholes. One of them, numbered 24, is visible in FIG. 1. The other part, 22, of the chuck has a bevelled gear 26 formed around its periphery at an end toward the first part 20.

The clamps, or jaws, 18 of the chuck open and close in response to relative movement between parts 20 and 22 of the chuck, and that relative movement is accomplished with a key. A standard chuck key includes a cylindrical shank having a pin, or key, of reduced diameter at one end and a handle that extends laterally through the shank at the other end. The device also includes a bevelled gear fixed to the shank adjacent to the pin, or key, so that all three, pin, gear, and shank, lie on a common axis.

Keys of that kind are shown in FIGS. 1 and 3, except that in the case of both of those figures, the key also includes a means by which it can be fastened to the drill chuck and stored with some part of the drill other than the chuck. Thus, the key in FIG. 1 includes a shank 28, a handle 30, and a bevelled gear 32. The pin is just barely visible. It is like the pin, or key, 34 in FIG. 3 where the chuck key also includes a shank 36, a cross-handle 38, and a bevelled gear 40.

Both of the chuck keys are provided with a fastening means, the first requirement of which is that it must be capable of holding the key on the chuck with the pin engaged in the keyhole, such as keyhole 24 of FIG. 1, while its bevelled gear engages the teeth of the chuck, such as teeth 26 of the chuck shown in FIG. 1. The basic key must be capable of rotation about the axis of the shank while its pin and bevel gear are disposed within the keyhole and meshed with the teeth of the chuck, respectively.

Returning to FIG. 3, the key fastening means, which is generally designated 42, includes a cylindrical sleeve 44 through which the shank 36 extends and in which it is rotatable. The sleeve is located between the handle 38 and the bevelled gear 40. At the end of the sleeve 44, toward the bevelled gear 40, the fastening means is provided with a cross-plate 46. That plate lies in a plane perpendicular to the axis of the shank 36, and it includes a central opening, not shown in FIG. 3, through which the shank extends. The plate 46 is approximately rectangular in shape and it is provided with a pair of arms 47 and 48, one at each of two opposite ends of the plate, and those arms extend downwardly, in FIG. 3, one on each side of the pin 34 and gear 40. They extend downwardly in parallel planes over a portion 47a and 48a, respectively, of their length, down to a level slightly below the end of pin 34. Thereafter, both arms are bent inwardly toward one another in a section 47b and 48b, respectively, in a direction that is both downwardly and inwardly. Finally, the ends, 47c and 48c, respectively, of the arms are bent back outwardly and downwardly.

The fastening means includes a means for biasing the arms 47 and 48 to the relaxed condition shown in FIG. 3.

In that condition, portions 47a and 48a of the arms are separated apart a distance greater than the diameter of the first, smaller diameter part of the chuck with which the key is to be associated. However, sections 47b and 48b of the arms are bent toward one another so that in relaxed condition, the spacing between them is less than the diameter of that first part of the chuck. While it is not essential, in preferred form the separation between the lower end of the pin 34 and the point at which the arms are bent intermediate sections b and c is less than half the diameter of the first part of the chuck with which the key is to be associated. That results in a cam action as the key is assembled on a chuck.

In preferred form, the arms are made of strips of spring metal, and the key is associated with a chuck by placing the ends 47c and 48c of the arm against the cylindrical side wall of the first part of the chuck, and pushing on the handle end of the key in a direction toward the pin. When that is done, the arms 47 and 48 are forced or cammed apart as the pin 34 approaches the portion of the chuck that contains the keyhole. The key is placed so that the pin 34 is aligned with one of the keyholes, such as keyhole 24. As the key begins to enter the keyhole, the ends of the arms of the fastening means pass diametric points on the chuck. After that happens, the resilience in the arms 10 acts by cam action to pull the key so that the pin 34 seats in the keyhole, and so that the teeth of the bevelled gear 40 are made to mesh with the teeth 26 of the chuck.

In addition to the elements thus far described, the fastening means in FIG. 3 includes a stiffening plate 50 which is bonded to the lower face of plate 46. It, too, has a central opening through which the shank 36 of the key extends.

The unit of FIG. 3 also includes a spring clip 52 which, in this version, is bolted to the arm 47 by machine screw 54. The clip is formed of a resilient material and has a size so that it can be forced over, or clipped upon, the power cord 14 of the drill. The clip will clamp the cord sufficiently so that the key and its fastening means will be retained on the cord.

The fastening means 56 in FIG. 1 is identical with the fastening means 42 of FIG. 3 with the exception that the unit in FIG. 1 does not include the clip or the machine screw and nut 54. While not essential, it is preferred that the sleeve 44 be fixed to plate 46 and 50, and that is true in the case of both of these units.

A number of variations in the fastening means are possible. In addition to those illustrated in FIGS. 1 and 3, two preferred forms are shown in FIGS. 5 and 6, respectively. As in the units of FIGS. 1 and 3, the arms and the plate of the fastening element are integrally formed from a strip of spring material. In FIG. 6, the unit includes a plate 60, an arm 61, and another arm 62. The lower end of arm 62 is extended downwardly and the extension is bent into the shape of a clip 64 which has size and resilience so that it can serve the same function as is served by the clip 52 in FIG. 3.

In FIG. 5, the lower ends of arms 66 and 67 are rolled inwardly at 68 and 69, respectively. They are rolled to form cylindrical members, and they are rolled inwardly so that they extend toward one another. The upper surface of those cylinders 68 and 69 serve the same function as do the sections 47b and 48b or the unit of FIG. 3. That is, they serve to bear against the outer wall of the smaller diameter, or first part, 20 of the chuck and tend to cam the key into the keyhole and the gears in meshed condition.

There is another difference in the unit shown in FIG. 5. Like the units of FIGS. 1 and 3, it includes a stiffening plate, but in FIG. 5 the stiffening plate is fixed to the upper side of the plate to which the arms are fixed. Moreover, the plate 70 in FIG. 5 is extended in one direction, and the extension is bent to form a clip 72 which serves the same function as does the clip 52 in FIG. 3 and the clip 64 in FIG. 6.

The unit in FIG. 5 illustrates another variation. The fastening element of FIG. 5 does not include a cylindrical member corresponding to cylinder 44 in FIG. 3. Instead, the shank 74 is formed with a peripheral groove at a distance along its length above the bevel gear 76 equal substantially to the thickness of the stiffening plate 70 and plate 78. A C-shaped retaining ring 80 is forced into that groove and serves to keep the fastening element positioned adjacent to the bevelled gear 76 while permitting rotation of the key relative to the fastening means.

While the apparatus depicted in FIGS. 3, 5 and 6 all include a retaining means by which the key and its fastening means may be retained with the drill so that it will not become misplaced when not associated with the chuck, it is not essential that the retaining means be a part of the key and holding means structure. The retaining means can, instead, be part of the drill, and for many applications that is the preferred form for practicing the invention. To facilitate description, retaining means that forms part of the drill structure, rather than part of the key structure, is herein called a "keeper." In FIG. 1, the keeper 84 is fastened by a machine screw 86 to an L-shaped bracket 88 that is fixed to and extends downwardly from the pistol grip 90 of the drill 10. The keeper has the shape of a spool, the cylindrical body of which is formed with a circumferential recess 92 which is sufficiently wide, and sufficiently deep, to accommodate the pin portion, or "key" portion of a chuck key.

The spool 84 is symmetrical about its central axis. Its shape can be seen in elevation in FIGS. 2 and 7. The spool 98 of FIG. 2 differs from spool 84 in that it does not have a central opening for accommodating a fastening machine screw. Instead, the upper flange 100 of spool 98 is provided with threaded openings, not visible in the drawing, which accommodate two machine screws, 102 and 103. Those machine screws are employed to bolt a U-shaped bracket 104 to the outer face of flange 100. The U-shaped bracket has size to accommodate the power cord 14 of the drill and to clamp the keeper of FIG. 2 to the power cord when assembled with the cord with its machine screws 102 and 103 turned up tight against the bracket.

The keeper 110 of FIG. 7 has the same shape in elevation. It includes an upper flange 112 and a lower flange 114. The body of the spool 116 is formed with a cylindrical recess 118 to accommodate the pin of a chuck key in the manner illustrated in FIG. 1, when the fastening means of the key assembly is employed to hold the key on the keeper, as is illustrated in FIG. 1.

In FIG. 7, the upper surface of the flange 112 is fixed by any convenient means to the lower face of the pistol grip 120 of a drill. In this case, it is located adjacent to a grommet 122 by which a power cord 124 is led into the interior of the grip.

While convenient, it is not essential that the keeper spool be provided with flanges. The keeper 130 of FIG. 4 has no flanges. Moreover, it is not essential that the pin of the key be accommodated in a cylindrical recess. In FIG. 4, the spool is formed with a series of cut-outs spaced around its periphery into which the pin can be inserted. In the unit FIG. 4, there are three recesses. Two of them are visible, and they are identified by the reference numerals 132 and 134.

FIG. 8 illustrates that the spool keeper may be formed by the metal stamping or draw processes. The upper portion 150 of the assembly is drawn with a flange 152 which extends outwardly from a cup 154 which serves as the main body or portion which the fastener arms embrace. The lower part of the cup is drawn to reduced diameter to provide clearance for the pin of the key. The lower part of the keeper comprises a shallow cup 156 and an outer flange 158. A spring clip 160 fixed to the center of the spool is arranged to clip to the power cord of a drill, or some other part, and the assembly is held together with a self-tapping screw 162.

It will be apparent that the keeper need not be a complete spool and that the structures shown are intended to represent the range of shapes from partial spools to complete spools. However, whether a complete spool or only a part of a spool, the keeper is constructed so that forcing the arms of the fastening means over the keeper causes the arms to spread apart, and then by cam action to draw the key toward the keeper such that the coaction between the fastening means and keeper is the same as the coaction between the fastening means and the small diameter, first part, of the drill chuck.

Although I have shown and described certain specific embodiments of my invention, I am fully aware that many modifications thereof are possible. My invention, therefore, is not to be restricted except insofar as is necessitated by the prior art.

I claim:

1. For an electric drill of the kind having a chuck whose relatively moving parts are rotatable by a key, the key including a pin insertable into a first part of the chuck and a gear whose teeth mesh with teeth on a second part of said chuck when the pin is inserted to the first part of said chuck;

an improved key and key attachment assembly comprising a key having a shank ending at one end in a pin and a gear;

fastening means for clamping the key to said first part of a drill chuck with its pin in the first part of the chuck and with its teeth in mesh with the teeth of the chuck while permitting simultaneously rotation of the key and said second part of the chuck;

said clamping means comprising a pair of spaced resilient arms extending in like direction on opposite sides of said pin and gear;

said arms being biased toward one another to a position in which their spacing is less than the dimension across said first part of the chuck; and securing means for securing said arms to the key while permitting rotation of the gear relative to said arms.

2. For an electric drill of the kind having a chuck whose relatively moving parts are rotatable by a key, the key including a pin insertable into a first part of the chuck and a gear whose teeth mesh with teeth on a second part of said chuck when the pin is inserted to the first part of said chuck;

an improved key and key attachment assembly comprising a key having a shank ending at one end in a pin and a gear;

fastening means for clamping the key to said first part of a drill chuck with its pin in the first part of the chuck and with its teeth in mesh with the teeth of the chuck while permitting simultaneously rotation of the key and said second part of the chuck;

said clamping means comprising a pair of spaced resilient arms extending in like direction on opposite sides of said pin and gear;

said arms being biased toward one another to a position in which their spacing is less than the dimension across said first part of the chuck;

securing means for securing said arms to the key while permitting rotation of the gear relative to said arms; and end portion of said arms being formed with surfaces extending away from one another and away from said key and such that portions of the arms adjacent to said end portions are formed with the surfaces extending toward one another and away from said key whereby the arms are first cammed apart as the arms are forced against said first part of a chuck and thereafter cammed toward the pin and into said first part of the chuck.

3. The invention defined in claim 2 which further comprises retaining means for retaining the key on the drill.

4. The invention defined in claim 3 in which said retaining means comprises a spring clip, of size to clip upon an electric power cord, fixed to one of said securing means and said arms.

5. The invention defined in claim 4 in which said spring clip is formed of an extension of one of said arms.

6. The invention defined in claim 3 in which said retaining means comprises a keeper member including a body the dimension across which is greater than the spacing between the outer ends of said arms when said arms are in relaxed condition.

7. The invention defined in claim 6 in which said keeper is spool shaped.

8. The invention defined in claim 6 in which said keeper is spool shaped, having a cylindrical body and flanges, one at each end of said body.

9. The invention defined in claim 7 in which said spool is formed with a cylindrical body having portions cut away, the cut-away portions being of a size to accommodate the pin of said key.

10. The invention defined in claim 6 which further comprises means for fixing said retaining means to the housing of an electric drill.

* * * * *